Oct. 15, 1935.  F. E. KLING  2,017,366
ROTARY SHEARS
Filed May 21, 1934  3 Sheets-Sheet 2
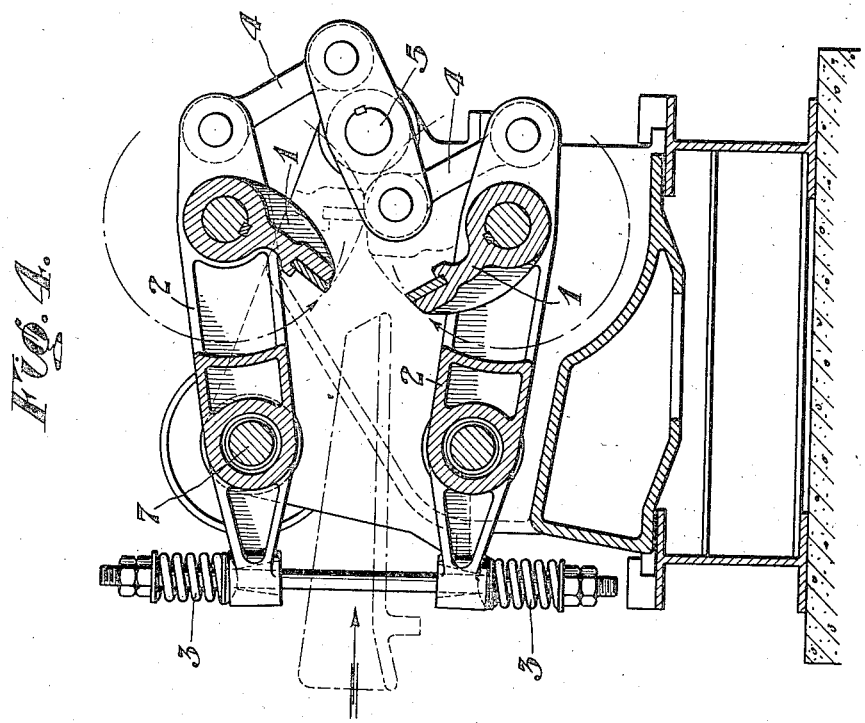
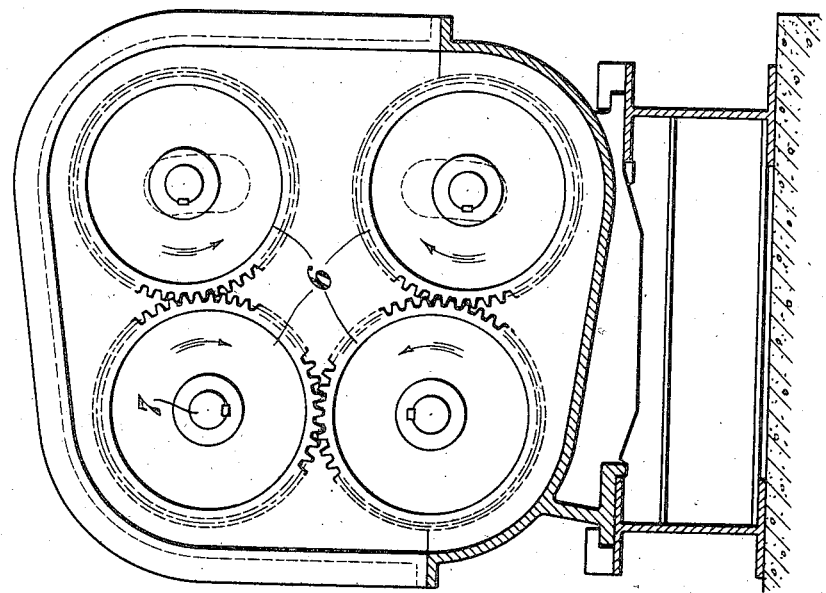
Inventor:
FRED E. KLING,
by his Attorneys.

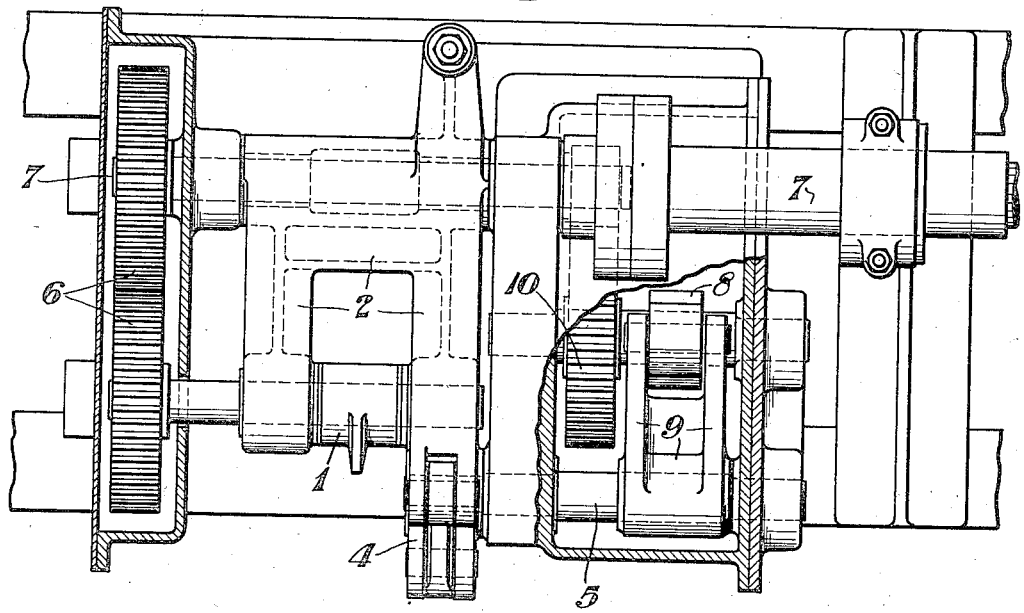
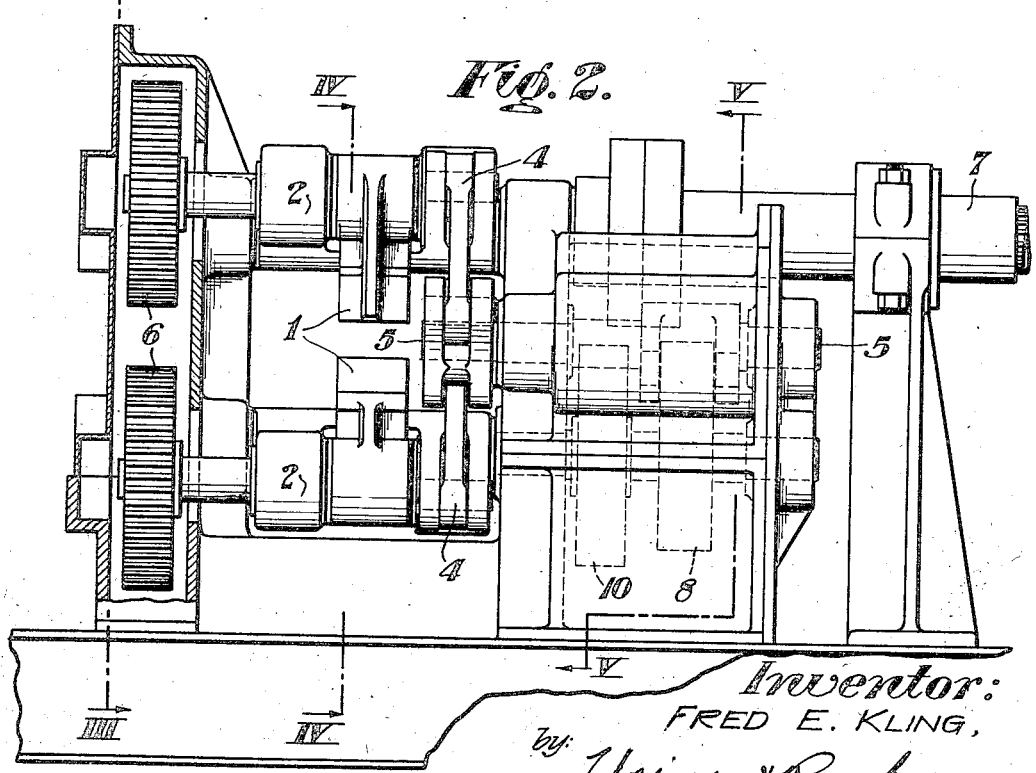

Oct. 15, 1935.  F. E. KLING  2,017,366
ROTARY SHEARS
Filed May 21, 1934  3 Sheets-Sheet 3

Inventor:
FRED E. KLING,
by Usina & Rauber
his Attorneys.

Patented Oct. 15, 1935

2,017,366

UNITED STATES PATENT OFFICE 2,017,366

ROTARY SHEARS

Fred E. Kling, Youngstown, Ohio

Application May 21, 1934, Serial No. 726,792

1 Claim. (Cl. 164—66)

This invention relates to rotary shears, one of the objects being to improve their construction so that they can shear work traveling at high speeds. Another object is to improve their construction so that they shear more smoothly. Other objects may be inferred.

Referring to the accompanying drawings:

Figure 1 is a top view of an example of a rotary shear embodying the principles of the present invention.

Figure 2 is a side view of the machine.

Figures 3, 4 and 5 are cross-sections respectively taken from the lines III—III, IV—IV and V—V in Figure 2.

Figure 6:
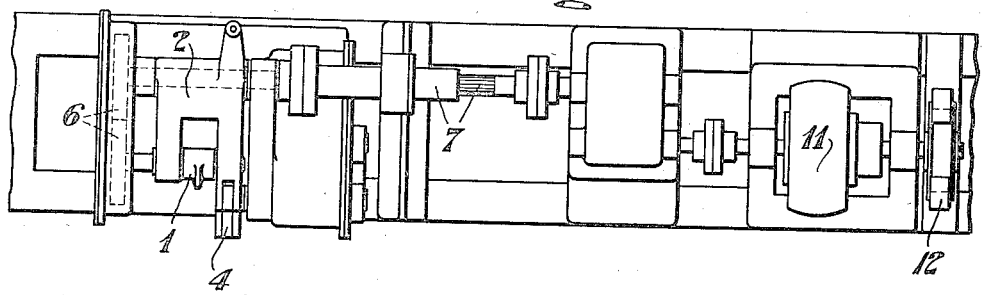
Figure 6 shows how the shear may be powered.
Figure 5:
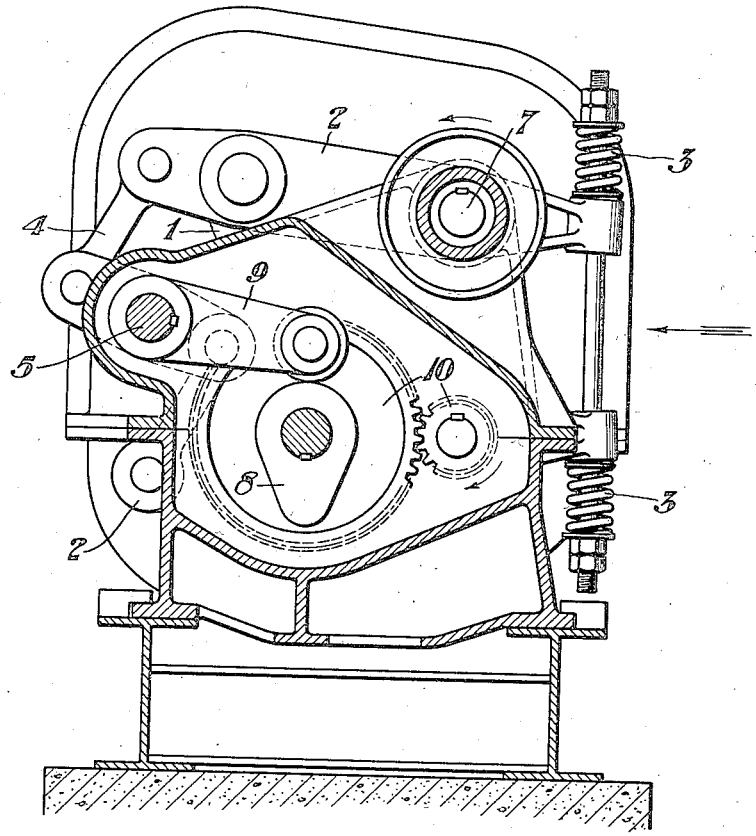

This shear includes rotary knives 1 that are constructed to cooperatively shear work passing therebetween. They are mounted by swinging arms 2 for reciprocation between positions where they clear such work when rotated and positions where they cooperatively shear such work when rotated. Springs 3 normally hold them in their first named positions, and a linkage 4, operated by rotational motion of a shaft 5, reciprocates them to their second named positions.

Gearing 6 is constructed and arranged to continuously interconnect the knives 1 for proper synchronous rotation, this gearing receiving rotation through a shaft 7 which may be driven by any suitable means capable of attaining rotative speeds sufficiently high to effect rotation of the knives 1 at peripheral speeds at least approximating the linear speeds of the work.

A rotary cam 8 is constructed and arranged to reciprocate the knives 1 between their named positions by way of a cooperative lever 9 fixed to the shaft 5. Reduction gearing 10 continuously interconnects the cam 8 and the gearing 6. The gearing 10 and the shape of the cam 8 are such that the knives 1 are reciprocated from their first named positions approximately at a time when they are rotated adjacently toward each other by the gearing 6, and to their second named positions approximately at a time when they are thusly rotated to their ultimate cooperative shearing positions. The means for driving the shaft 7 may consist of an electric motor 11 provided with a suitable brake 12. An electrical system may be provided for controlling such a means so that its operation is limited to that effecting operation of the shear through one complete shearing cycle.

Now let it be assumed that work, such as a steel bar, is traveling between the knives 1 and that it is desired to shear this bar. Driving power is applied to the shaft 7 so as to rotate the knives 1 through the gearing 6. Because of the reduction gearing 10 connecting the cam 8 to this gearing 6, the knives are not reciprocated to their second named positions until after they have each traveled through at least one full rotation. The cam 8 then cooperates with the lever 9 to reciprocate the knives to their second named positions so that the bar is sheared, the springs 3 effecting the return in this reciprocation.

The knives 1 may continue to rotate through at least another full rotation before they must be brought to rest. The number of rotations permitted the knives before and after their reciprocation to their second named positions is dependent on the ratio of the reduction gearing 10.

The advantages of the improved shear are at least two-fold. First, there is time to overcome the inertia of the gearing 6 and the knives 1 whereby their acceleration to extremely high speeds and their subsequent deceleration is possible. Secondly, because of the construction of the gearing 10 and of the cam 8, the knives 1 are reciprocated from their first named positions approximately at a time when they are rotating adjacently towards each other and so that they arrive at their second named positions approximately at a time when they are rotating to their ultimate cooperative shearing positions, whereby the shearing effect produced is a combination of the action of a vertical shear and that of a conventional rotary shear. For obvious reasons, a vertical shear shears work more smoothly than does a rotary shear, and the introduction of at least some of its action naturally causes the shear being described to have some of its advantages in this respect.

Although a specific example of the invention is disclosed in accordance with the patent statutes, it is not intended to thereby limit its scope, except as defined by the following claim.

I claim:

A shear including the combination of rotary knives that are constructed to cooperatively shear work passing therebetween, swinging arms mounting said knives for reciprocation between positions where they clear said work when rotated and positions where they cooperatively shear said work when rotated, springs arranged to urge said arms to their first named position, a linkage interconnecting said arms, a shaft arranged to turn a part of said linkage so as to reciprocate said arms to their second named position, gearing constructed and arranged to interconnect said knives for proper synchronous operation, a lever fixed to said shaft, a rotary cam arranged to throw said lever so as to effect reciprocation of said arms between said positions, and reduction gearing continuously interconnecting the first named gearing and said cam, the second named gearing and said cam being constructed and arranged so that said arms are reciprocated from their first named positions at a time when said knives are rotated adjacent each other by rotation of the first named gearing and arrive at their second named positions at least approximately at the time said knives are rotated to their ultimate cooperative shearing positions by rotation of the first named gearing, whereby the shearing action produced is a combination of the action of a vertical shear and that of a rotary shear.

FRED E. KLING.